United States Patent  [11] 3,614,455

[72] Inventor Rudolf Paulus
 Munich, Germany
[21] Appl. No. 861,775
[22] Filed Sept. 29, 1969
[45] Patented Oct. 19, 1971
[73] Assignee AGFA-Gevaert Aktiengesellschaft
 Leverkusen, Germany
[32] Priority Sept. 27, 1968
[33] Germany
[31] P 17 97 439.9

[54] FILM FRAME LOCATION DEVICE COMPRISING MEANS FOR DETECTING BOTH LEADING AND TRAILING EDGES OF FRAME
22 Claims, 4 Drawing Figs.
[52] U.S. Cl. ................................................ 250/219,
 250/214
[51] Int. Cl. .................................... G01n 21/30,
 H01j 39/12

[50] Field of Search ............................................ 250/219 F,
 214 P, 219 ID; 83/50

[56] References Cited
 UNITED STATES PATENTS
3,469,105 9/1969 Stasey ........................... 250/219 FR
3,469,480 9/1969 Nassenstein et al. ........... 250/219 FR Primary Examiner—Archie R. Borchelt
Assistant Examiner—T. N. Grigsby
Attorney—Michael S. Striker ABSTRACT: Frames in a filmstrip are separated by frame lines. The frames are centered relative to further processing means by use of first and second photoelectric measuring means, which determine, respectively, the trailing edge of a preceding frame line and the leading edge of the successive frame line. The frame is centered corresponding to the first determined edge.

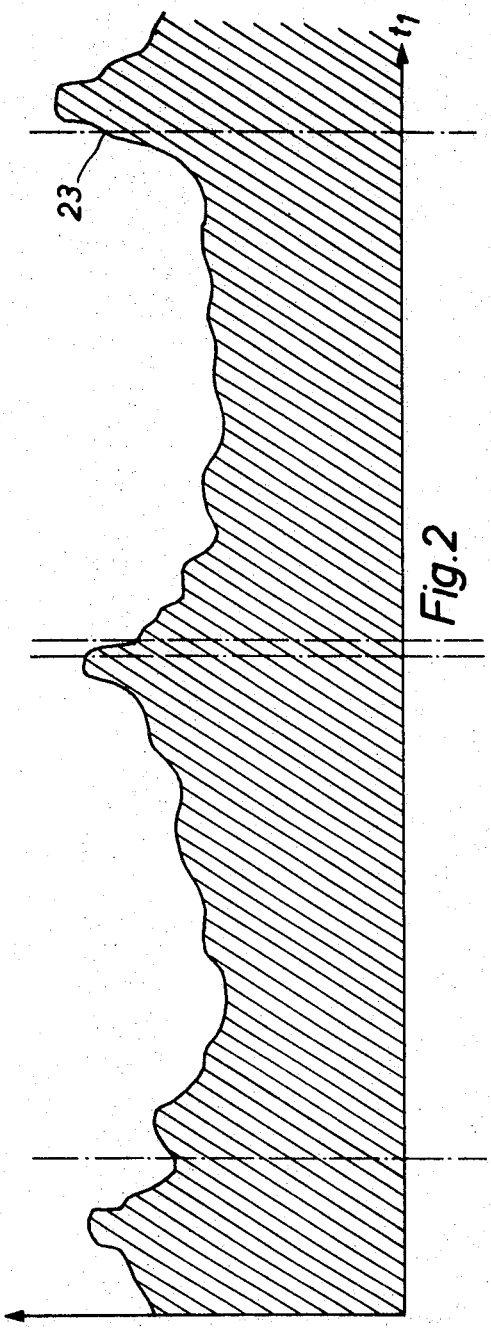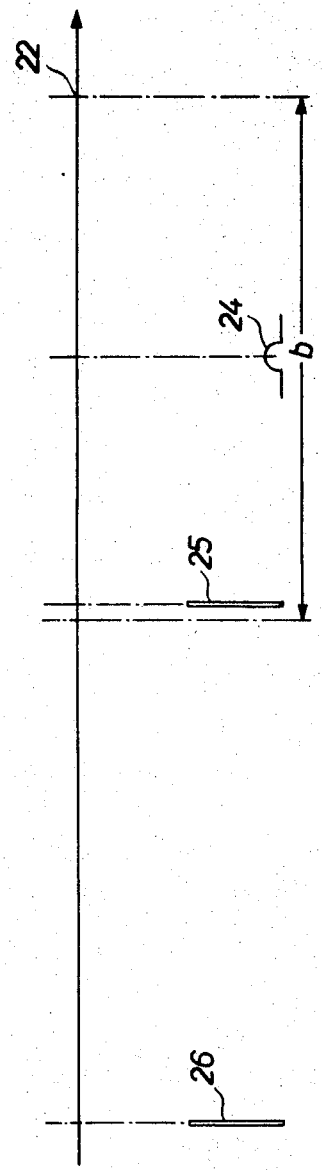

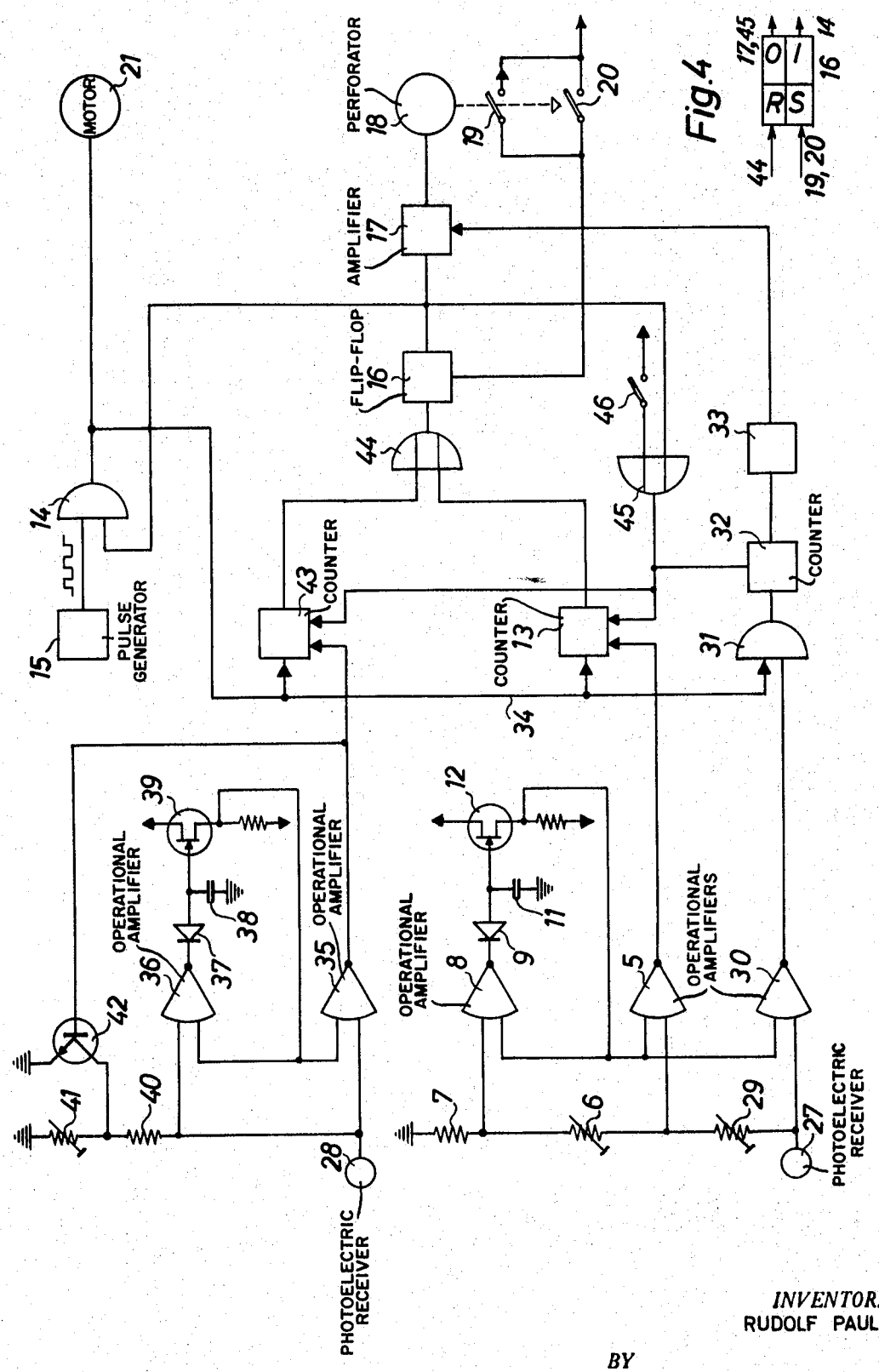

FILM FRAME LOCATION DEVICE COMPRISING MEANS FOR DETECTING BOTH LEADING AND TRAILING EDGES OF FRAME

BACKGROUND OF THE INVENTION

This invention relates to an arrangement for locating the frames in a filmstrip having a plurality of such frames separated by frame lines. In particular it relates to such arrangements wherein photoelectric scanning means are used having slots which are parallel to the frame lines. These frame lines are defined as those places wherein the film strip has an extreme value of transmissivity. One such system is known and described in U.S. Pat. No. 3,469,480. Each frame is bound by the trailing edge of the preceding frame line and the leading edge of the successive frame line. Thus in the case of negatives the frame lines correspond to the maximum value of transmissivity as determined by photoelectric means and the trailing edge of the frame line may be located at the first place wherein the transmissivity value has decreased by a predetermined amount following such a maximum value. All this is stated in the above-identified U.S. patent.

However, in this U.S. patent, only one set of measuring means for measuring the transmissivity is provided. These measuring means are used to determine the trailing edge of the preceding frame line and center the frame in accordance with this criterion. Thus the first decrease in transmissivity following a maximum value is considered the criterion for centering the frame. It is assumed that this maximum value of transmissivity will appear only once in a lengthwise portion of a film corresponding to the width of a frame. In order to recognize the trailing edge of this frame line to center the frame, it is assumed that at lest in reasonably properly exposed negatives the transmissivity is decreased by at least a minimum value, for example 3 percent as related to the transmissivity existing within the frame line. This assumption is valid in the majority of cases. However, the possibility exists that this criterion is not met at a particular frame line when the exposure of the picture has taken place towards an extremely bright light source, as for example when the picture has been taken through a window into the sunlight or by means of a flash in a dark room which has high light absorbing characteristics. In this case the arrangement in accordance with the above-identified patent cannot result in a proper location of the frame by means of locating of the trailing edge of the preceding frame line.

SUMMARY OF THE INVENTION

It is an object of this invention to improve the system set forth in the above-identified patent in such a manner that even those frames whose preceding trailing edge does not exhibit a sufficient contrast relative to the associated frame line may be properly centered, without requiring an excess of equipment.

This invention thus comprises an arrangement for determining the location of a frame in a filmstrip having a plurality of frames separated by frame lines each of which has a leading and a trailing edge so that each frame is bounded by the trailing edge of the preceding frame line and the leading edge of the successive frame line. It comprises first measuring means for determining for any frame the location of the trailing edge of the preceding frame line and generating a trailing edge signal signifying said location. It further comprises second measuring means for determining for said frame the location of the leading edge of the successive frame line, and generating a leading edge signal signifying said location. Further provided are selector means associated with said measuring means for indicating the location of one of said edges.

Thus in accordance with the present invention, a particular frame may be centered as long as a sufficient transmissivity difference exists ether at the trailing edge of the preceding frame line or the leading edge of the successive frame line. This difference may, for example, be 3 percent. If, however, the required difference in transmissivity does not exist at either of the edges of the frame lines determining a frame, then the leading edge of the successive frame line is considered that location at which there is an increase in transmissivity by the factor of 1.03 to the maximum value. This means tat the total picture content of the frame is reproduced in the copy, although the reproduction is translated relative to the negative by the width corresponding to the totally underexposed edge. This generally results in satisfactory copies.

The use of second measuring means requires not only the use of a second photoelectric apparatus, but also associated computing equipment to evaluate the signals generated by the photoelectric means. These computing means are of the digital computer type in the patent mentioned above. This results in high accuracy but requires a great deal of equipment. Thus doubling of such equipment for use with the second photoelectric means would be impossible for practical purposes. Thus in accordance with the present invention the photoelectric means are quipped with analog computers containing operational amplifiers. The operational amplifiers serve to store a voltages on a condenser which corresponds to a measured value of transmissivity. The stored transmissivity value is then compared by the operational amplifier to the next subsequent measured transmissivity signal. If the subsequent measured transmissivity signal exceeds the stored signal, the higher value is stored and a counter is reset. As the measurement progresses, the counter is fed pulses corresponding to the advancement of the film past the measuring location. Overflow of the counter serves to activate further processing means.

The operational amplifiers and counters are almost identical for both the first and second photoelectric means. They may be constructed from integrated circuits at a fraction of the cost required by the corresponding digital circuits. The accuracy of the analog computers are entirely sufficient for the particular application.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 2 shows an example of the variation of transmissivity along the length of a film strip;

FIG. 3 shows arrangement of first and second photoelectric means relative to the frame lines and relative to further processing means; and FIG. 4 is a block diagram showing a system using first and second measuring means for locating the frame.

DESCRIPTION OF THE PREFERRED EMBODIMENT

Figure 1:
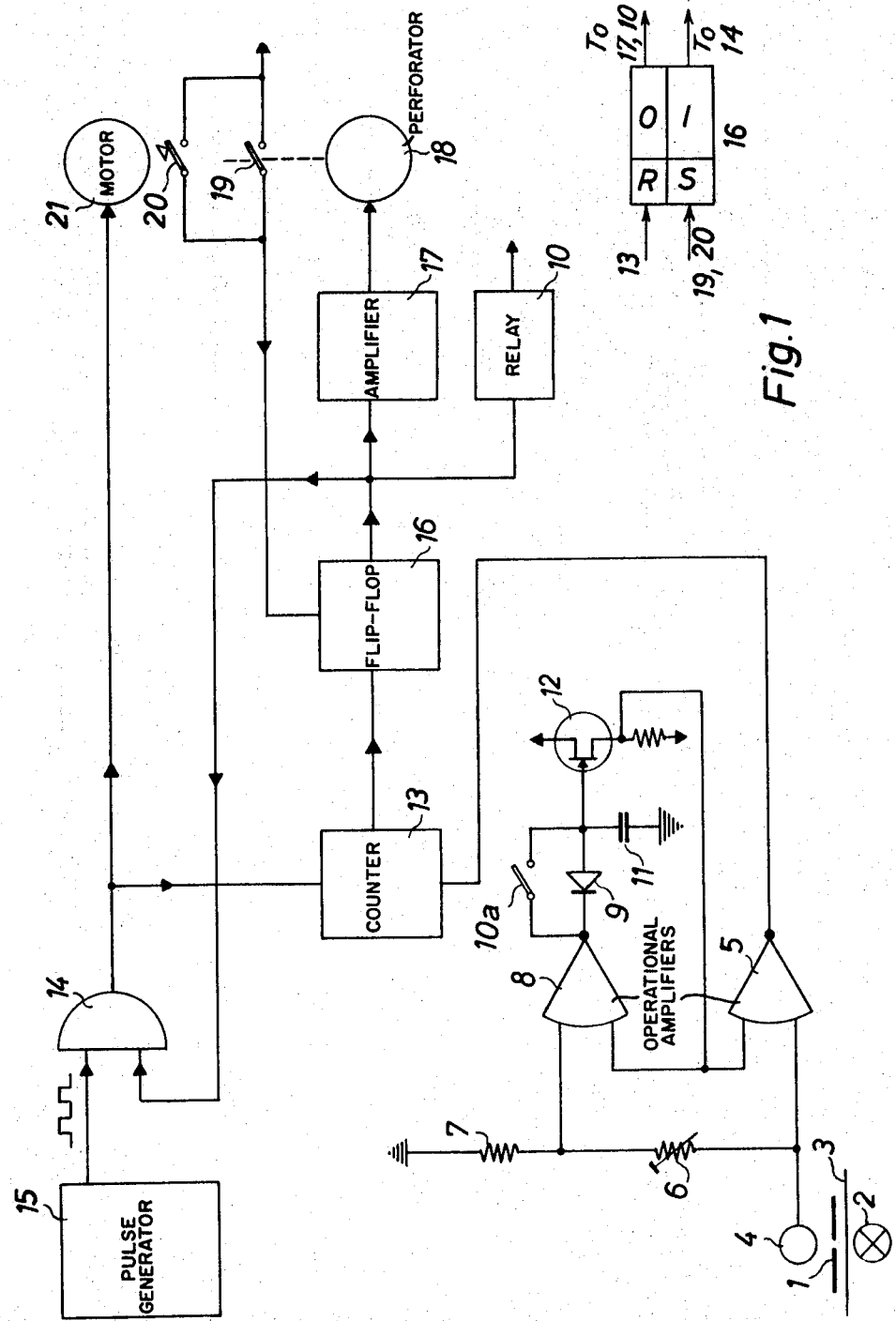
FIG. 1 is a schematic diagram for locating a frame by means of first measurement means employing operational amplifiers.

The preferred embodiment of this invention will now be discussed with reference to the Figures.

In FIG. 1, the light emanating from a lamp 2 is transmitted through the film strip 3 whence it passes through a slot in a diaphragm 1. A photoelectric receiver 4 thus receives light in the form of a narrow line. The photoelectric receiver 4 may for example be a secondary electron multiplier or a photodiode. The output of the photoelectric receiver 4 is connected to the first input of an operational amplifier 5 which serves to compare the signals appearing at its two inputs. If the signals are unequal in a predetermined direction no output signal is generated by the operational amplifier. If, however, both signals are equal or the signal at the first input exceeds that at the second input, then a signal is generated at the output of operational amplifier 5. These signals are herein referred to as possible trailing edge signals. Such operational amplifiers are well known in the field of analog computers and may be obtained as a unit in the form of integrated circuits.

Voltage divider means, here a resistance 6 connected in series to a resistance 7 are connected from the output of photoelectric receiver 4 to ground. Resistance 6 is a variable resistor which is smaller than resistance 7 by a factor of approximately 30. At the common point of resistors 6 and 7 is connected the first input of a second operational amplifier 8. The output of this operational amplifier 8 is connected via a diode 9 to one terminal of a condenser 11 whose other terminal is connected to ground. Because of the connection via the diode this permits charging of the capacitor 11 but prevents discharge of said capacitor via the operational amplifier. The capacitor serves to provide stored transmissivity signals corresponding to the maximum measured transmissivity signal as supplied by photoelectric receiver 4. It will be noted that the diode 9 is connected in parallel to switch contact 10a of a relay 10. The first terminal of capacitor 11 further connected to the base of a field effect transistor 12 from whose output a voltage corresponding to the capacitor voltage may be derived without causing loading of said capacitor and thus a draining of its charge. The voltage on the capacitor is connected to the second input of operational amplifier 8 and to the second input of operational amplifier 5. Operational amplifier 8 and its associated circuitry may be considered first comparator means, while operational amplifier 5 may be considered further first comparator means. All the above circuitry forms part of the first measuring means, as does a counter 13 which is adapted to be reset by the possible trailing edge signals. The counting signals for counter 13 are supplied by a pulse generator 15 which may for example generate pulses at a frequency of 500 Hz. The pulses are applied to the counter 13 via an AND-gate 14 whose second input is supplied by the "1" of a flip-flop 16, which flip-flop is in turn controlled by the counter overflow. The "0" output of flip-flop 16 activates an amplifier 17 which in turn activates further processing means, for example a perforator 18 which serves to make a mark at the edge of the film strip. Perforator 18 may also serve to activate a switch 19 which is connected in parallel to a starting switch 20. Finally a flip-flop 16, or more particularly its "0" output activates relay 10 which closes contact 10a, short-circuiting diode 9.

The output of AND-gate 14 also supplies pulses from generator 15 to a step motor 21 which advances film strip 3 step by step, each step corresponding to 0.2 mm. along the predetermined path past the measuring means. Simultaneously the pulses are supplied to the counter 13 which is so arranged that its overflow serves to set flip-flop 16. The capacity of the counter is made substantially equal to the average frame width.

Operation of the above-described arrangement is as follows:

At the beginning, generator 15 oscillates at the determined frequency. However the pulses are not transmitted since AND-gate 14 is blocked by flip-flop 16. If the starting switches now are depressed, flip-flop 16 is switched to its set state AND-gate 14 becomes transmissive, activating step motor 21 as well as counter 13. While the film is being advanced, the photoelectric receiver 4 receives light responsive to the transmissivity of the film strip and generates a current which is transformed into a voltage via voltage divider 6 and 7. The voltage value, corresponding to a first comparator signal, is compared with the stored transmissivity signal, namely the signal on capacitor 11, by means of the operational amplifier 8. Since, however, contact 10a will close until the starting switch was depressed, capacitor 11 has stored an almost smaller transmissivity according to the foregoing part of film. Thus the comparison in amplifier 5 generally results in showing that the measured transmissivity signal is larger than the stored transmissivity signal. Therefore, the counter 13 is reset. Simultaneously the first comparator signal which is less than the measured transmissivity signal by a factor determined by the adjustment of resistance 6 is stored in capacitor 11. The capacitor 11 is charged via operational amplifier 8 until both inputs of said amplifier have the same voltage. Because of resistance 6 the measured transmissivity signal may be less than the stored transmissivity signal by a factor determined by resistance 6, without impeding the generation of possible trailing edge signals by operational amplifier 5. Thus, counter 13 will continue to be reset even though the measured transmissivity signals vary somewhat within the frame line due, for example, to uneven distribution of grain within said frame line. The factor of 3 percent may be considered the positioning criterion. As long as the counter is reset it cannot overflow and, as described above, the counter overflow constitutes the trailing edge signal which activates the further processing means.

Thus if a maximum transmissivity value has been determined for a filmstrip of negatives after a number of steps corresponding to a frame width, it may be assumed with a high degree of certainty that the frame line between two frames is being scanned. However, within the frame line the counter 10 will continue to be reset, since, as explained above, amplifier 5 will continue to generate possible trailing edge signals. When, however, the actual trailing edge of the frame line is reached, that is when the edge of the picture is opposite the scanning slot, the exposure of the film increases at least as much as the above-mentioned criterion, causing the transmissivity to decrease correspondingly and thus the comparison at operational amplifier 5 to be decided in favor of the stored transmissivity signal. Starting with this point the counter 10 is no longer reset since such a high value of transmissivity will not again be attained until the subsequent frame line. Since the capacity of the counter 13 causes it to overflow before this subsequent frame line reaches the position opposite the scanning slot, the counter actually does overflow causing the transport arrangement to come to a standstill because of the resetting of flip-flop 16. The resultant "0" output of flip-flop 16 causes the perforator means 18 to be activated via amplifier 17, and further causes relay 10 to be activated. Relay contacts 10a then close causing the discharge of capacitor 11, thus causing the stored transmissivity signal to be extinguished. The processing means 18 which may for example place a mark at the edge of the film at a predetermined distance from the located trailing edge of the frame line also activates switch 19 momentarily which causes flip-flop 16 to be switched to the set condition. As denoted previously, the flip-flop 16 is thus in the "1" state which permits transmission of pulses from pulse generator 15 to step motor 21 and counter 13. Thus a new scanning cycle commences.

While this type of analog operational amplifier for evaluating the signals furnished by photoelectric receiver 4 does not result in higher reliability of operation, it is to be recommended even for scanning with a single slot, since the equipment required is considerably less than for the digital means used in conjunction with the photoelectric means in the U.S. patent mentioned above. For further economy, operational amplifiers 5 and 8 may be contained within a single amplifier unit which incorporates not only the storing of the maximum transmissivity signal, but also the comparison function which results in the generation of the possible trailing edge signals.

FIG. 2 shows the variation of transmissivity of the filmstrip when said filmstrip is scanned with a slot perpendicular to the lengthwise direction of said filmstrip, when said slot is narrow compared to the width of a frame line. The substantially rectangular maximum values of transmissivity at the three frame lines are easily recognizable.

In FIG. 3 shown below FIG. 2 the arrangement of the further processing means along the length of the filmstrip relative to the first and second measuring means is shown. In this illustration the perforation is to be affixed to the edge of the filmstrip at a location corresponding to the center of the frame. Point 22 shows the location of the trailing edge of the last preceding frame line at the time at which the processing means, or perforator, is activated. This trailing edge is denoted by reference number 23. The location of the perforator means is denoted by 24 and is as mentioned above, in the center of the located frame. It is removed from the previously identified point 22 by 90 scanning steps of 0.2 mm. each, that is by 18 mm. This is exactly half of the average width of 36 mm. film.

At a distance of 176 steps from the starting point 22, that is 0.8 mm. prior to the end of the average frame width the first scanning slot 25 is situated which in turn is displaced relative to the second scanning slot 26 by 184 steps, that is a length corresponding to a full frame width plus the average width of the frame line.

FIG. 4 shows a block diagram of an arrangement using first and second measuring means. 27 and 28 represent respectively the photoelectric receiving means receiving light through slots 25 and 26. Insofar as the components in the arrangement of FIG. 4 corresponds to those shown in FIG. 1 the same reference numbers are used. New components are as follows. A further resistance 29 has been added to the voltage divider comprising resistances 6 and 7. A third operational amplifier 30 compares each first measured transmissivity signal with the stored transmissivity signal derived from capacitor 11. It is the purpose of operational amplifier 30 to determine whether, within a distance corresponding to the width of a frame at least a predetermined minimum number of measured transmissivity signals occur which are substantially, for example by 10 percent, smaller than the maximum transmissivity value. This requirement is not fulfilled if, for example, the frame is totally unexposed because of failure of the shutter to trip. The signal furnished by operational amplifier 30, herein called exposure signals, are applied via a gate 31 to exposure signal counting means, namely counter 32. Operational amplifier 30 of course constitutes means for furnishing exposure signals. If counter 32 has received the predetermined number of exposure signals, for example 16 signals, a flip-flop 33 is switched. This flip-flop 33 supplies a signal to amplifier 17, herein considered gating means, in such a manner that amplifier 17 cannot transmit a signal if flip-flop 33 has not switched. Thus pictures which are not suitable for reproduction because of insufficient exposure are not marked. Gate 31 is an AND gate at whose second input the pulses from pulse generator 15 are applied so that only pulses which arrive at the correct time may be applied to counter 32. Thus noise pulses cannot be counted.

The measuring means associated with photoelectric receiver 28 are substantially equivalent to the arrangement shown in FIG. 1. Operational amplifier 35 responds to operational amplifier 5, operational amplifier 36 with diode 37, capacitor 38 and field effect transistor 39 corresponds to the similar component 8, 9, 11 and 12 of FIG. 1. However, resistance 6 between the inputs of amplifiers 36 and 35 is missing. These inputs are at equal potential. Instead resistance 7 is divided into two resistors 41 and 40. The adjustable resistor 41 which is smaller than resistor 40 by a factor of approximately 30 is shunted by a transistor 42. Transistor 42 works as a switch which is controlled by pulses generated by amplifier 35.

A counter 43 is connected to the output of gate 14 as is counter 13. Counter 43 is adapted to be reset by signals furnished by operational amplifier 35. The signals are referred to as possible leading edge signals herein. The outputs of counters 13 and 43 are connected to the inputs of an OR-gate 44 whose output is connected to a flip-flop 16. OR-gate 44 and flip-flop 16 constitute selector means. The arrangement operates as follows:

The operation of counter 13 with regard to the location of the trailing edge of the preceding frame line has been explained in detail in connection with FIG. 1.

The operation of the arrangement for locating the leading edge of the succeeding frame line is as follows.

The signal furnished by photoelectric receiver 28, namely second measured transmissivity signals, are compared to the stored transmissivity signals stored in capacitor 38, by amplifier 35. If, as is to be expected at the beginning of the scanning cycle, the second measured transmissivity signal is greater than the stored transmissivity signal, then amplifier 35 generates a possible leading edge signal for resetting counter 43. Simultaneously transistor 42 is blocked by the possible leading edge signal, so that resistance 41 becomes effective.

Since photoelectric receiver 28 acts as a constant current source, the same current flows in the circuit regardless of load resistance, so that the voltage appearing at the terminal of resistance 40 connected to the input amplifier 36 is increased by a factor determined by the ratio of the two resistances, tat is, is increased by this amount relative to ground potential. This increased value is now stored via amplifier 36 in capacitor 38. After the leading edge signal has disappeared, transistor 42 again becomes conductive so that the potential at the input of amplifiers 35 and 36 returns to the original value. At the next scanning step the voltage at the inputs of amplifier 35 will then only be considered equal, if the next measured value is higher than the stored value by an amount corresponding to the above-mentioned factor. This means that counter 43 is only reset if the transmissivity function has a positive steplike increase corresponding at least to this factor before reaching a maximum transmissivity value. The probability that this condition is satisfied anywhere except at the leading edge of the successive frame line is, for all practical purposes, nil.

If the arrangement has thus located the leading edge of the successive frame line, then no further second measured transmissivity values will occur which satisfy the requirements for resetting the counter 43. The counter thus advances steadily via the counter signals furnished by pulse generator 15 until it reaches the end of its capacity which corresponds approximately to the width of a frame. Since both the first and second measuring system operates independently of one another that counter of counters 13 and 43 will set flip-flop 16 via gate 44 which is the first to overflow. It is possible of course that both counters overflow simultaneously if the trailing edge of the preceding frame line is opposite the first slot at the same time that the leading edge of the successive frame line is opposite the slot associated with the second measuring means.

The perforator means 18 will be activated as described above via amplifier 17 if the flip-flop 33 has been switched because counter 32 has received a sufficient number of exposure signals. Operation of the perforator 18 causes switch 19 to close momentarily, setting flip-flop 16. This causes counters 13, 14 and 32 to be reset. This resetting of the counters may also be effected by means of a switch 46 whose closure furnishes a signal to OR-gate 45. This switch may for example be activated by a marking on the film which indicates a place where two individual film strips were joined. A new scanning cycle recommences after discharge of capacitors 11 and 38 and when gate 14 again permits the transmission of pulses to counters 13 and 43.

The above embodiment with the given numbers is particularly arranged for films having a frame length of 36 mm. For pictures of a size of 18×24 mm. or rectangular shape, the distance between point 22 and the scanning locations of slots 25 and 26, as well as a change in the capacity of the counters 13 and 43 must be effected. These changes can of course be readily accomplished.

The arrangements described above can of course also be used if the further processing means are the printer, rather than a perforating means for marking the center of the film. The arrangement can then be used to center the film directly within the printer.

While the invention has been illustrated and described as embodied in particular types of analog circuits, it is not intended to be limited to the details shown, since various modifications and structural and circuit changes may be made without departing in any way from the spirit of the present invention.

What is claimed as new and desired to be protected by Letters Patent is set forth in the appended claims.

1. Arrangement for determining the location of a frame in a filmstrip having a plurality of frames separated by frame lines each of which has a leading and a trailing edge so that each frame is bounded by the trailing edge of the preceding frame line and the leading edge of the successive frame line, comprising, in combination, first measuring means for determining for any frame the location of the trailing edge of the preceding frame line and generating a trailing edge signal signifying said location; second measuring means for determining for said frame the location of the leading edge of the successive frame line and generating a leading edge signal signifying said location; and selector means associated with said measuring means for indicating the location of one of said edges.

2. An arrangement as set forth in claim 1, wherein said filmstrip has an extreme value of light transmissivity at said frame lines; wherein said trailing edge and said leading edge of said frame lines are characterized, respectively, by a predetermined change of transmissivity from and to said extreme value; and wherein said first and second measuring means each comprise photoelectric means for measuring said transmissivity.

3. An arrangement as set forth in claim 2 further comprising transport means for transporting said filmstrip along a predetermined lengthwise path; and wherein said first and second measuring means are at a first and second location along said predetermined lengthwise path; and wherein said second location is spaced from said first location by a distance corresponding to the length of a frame.

4. An arrangement as set forth in claim 3, wherein each of said measuring means comprise a light slot parallel to said frame lines.

5. An arrangement as set forth in claim 4, wherein each of said light slots is narrow compared to the width of one of said frame lines.

6. An arrangement as set forth in claim 4 wherein said selector means are responsive to the first generated one of said trailing edge and leading edge signals.

7. An arrangement as set forth in claim 3, wherein further processing means are located at a determined location along said path; and wherein said selector means are adapted to generate a position signal indicating the position of said frame relative to said further processing means in dependence upon said leading or trailing edge signals.

8. An arrangement as set forth in claim 7, wherein said first measurement means comprise means for generating first measured transmissivity signals during the transport of said filmstrip past said first location; first comparator means for comparing first comparator signals corresponding to said first measurement signals to a stored transmissivity signal and storing the greater of the two, said stored transmissivity signal thus corresponding to an extreme value of transmissivity; said first comparator means being further adapted to generate a possible trailing edge signal when a measured transmissivity signal is less than the stored transmissivity signal.

9. An arrangement as set forth in claim 8, wherein said first measurement means further comprise first delay means responsive to said possible trailing edge signal and adapted to generate said trailing edge signal after a predetermined delay corresponding to transport of a predetermined portion of said filmstrip past said first location, said delay recommencing in full upon receipt of a subsequent possible trailing edge signal prior to generation of said trailing edge signal.

10. An arrangement as set forth in claim 9, wherein said first comparator means comprise first operational amplifier means having a first operational amplifier input for receiving said first comparator signal, a second operational amplifier input for receiving a feedback signal, a first operational amplifier output for furnishing a signal corresponding to the greater of the signals applied at the first and second operation amplifier inputs, a capacitor for storing said greater signal, and feedback means for connecting the output of said capacitor to said second operational amplifier input.

11. An arrangement as set forth in claim 10, further comprising voltage divider means for furnishing said first comparator signals as a predetermined percentage of said first measurement signals.

12. An arrangement as set forth in claim 11, wherein said further first comparator means comprise further operational amplifier means.

13. An arrangement as set forth in claim 9, wherein said transport means transport said film in steps; and wherein said delay means comprise a counter connected to the output of said further first comparator means in such a manner that each possible trailing edge signal resets said counter; further comprising pulse-generating means for generating pulses signifying each transport step; and means for applying said pulses to said counter to constitute counting signals, the overflow of said counter corresponding to generation of said trailing edge signal.

14. An arrangement as set forth in claim 10, further comprising a capacitor connected to said first operational amplifier output; wherein said feedback means comprise an isolating stage for preventing said second amplifier input from loading said capacitor.

15. An arrangement as set forth in claim 14, wherein said isolating stage comprises a field effect transistor.

16. An arrangement as set forth in claim 13, wherein the capacity of said counter is substantially equal to, but slightly less than, the width of a frame.

17. An arrangement as set forth in claim 7, wherein said second measurement means comprise second comparator means for comparing second comparator signals corresponding to second measurement signals increased by a predetermined percentage to stored transmissivity signals and storing the greater of the two, said stored transmissivity signals thus corresponding to maximum transmissivity values; and wherein said second measurement means comprises further second comparator means for comparing second measured transmissivity signals to said stored transmissivity signals and generating a possible leading edge signal when a second measurement signal exceeds the stored transmissivity signal.

18. An arrangement as set forth in claim 7 wherein said selector means comprise an OR circuit having a first input for receiving said trailing edge signal, a second input for receiving said leading edge signal, and an OR output for generating a position signal.

19. An arrangement as set forth in claim 18, wherein further processing means are located at a third location along said predetermined path of said filmstrip following said first and second location; and wherein said position signal activates said further processing means.

20. An arrangement as set forth in claim 19, further comprising gating means for gating the application of said position signal to said further processing means in dependence upon the presence of exposure signals indicating that said frame has been exposed; and means for furnishing said exposure signals in dependence upon said first measured transmissivity signals.

21. An arrangement as set forth in claim 20, wherein said means for furnishing exposure signals comprises third operational amplifier means adapted to compare said first measured transmissivity signals with said stored transmissivity signals and generate said exposure signals when a predetermined difference exists therebetween; and exposure signal counting means for counting the number of said exposure signals.

22. An arrangement for determining the location of a frame in a filmstrip having a plurality of frames separated by frame lines each of which has a leading and a trailing edge so that each frame is bounded by the trailing edge of the preceding frame line and the leading edge of the successive frame line, comprising, in combination, photoelectric means for generating measured transmissivity values corresponding to the transmissivity of said filmstrip; operational amplifier means for comparing said measured transmissivity signals to stored transmissivity signals and storing the greater of the two, said operational amplifier means being further adapted to generate a possible trailing edge signal when a measured transmissivity signal exceeds the stored transmissivity signal; counter means having a predetermined capacity corresponding to the width of a frame, sad counting means being further adapted to count counting signals and to generate a position signal upon overflow; pulse generator means for furnishing said counting signals; transport means for transporting said film along a predetermined path and adapted to be activated by said pulses from said pulse generator means; additional processing means located a predetermined distance from said measuring means, said predetermined distance corresponding to the capacity of said counter; and means for activating said additional processing means in response to said position signal.